May 4, 1926.
D. W. SMITH
WOOD SAWING MACHINE
Filed April 27, 1925
1,583,613
2 Sheets-Sheet 2
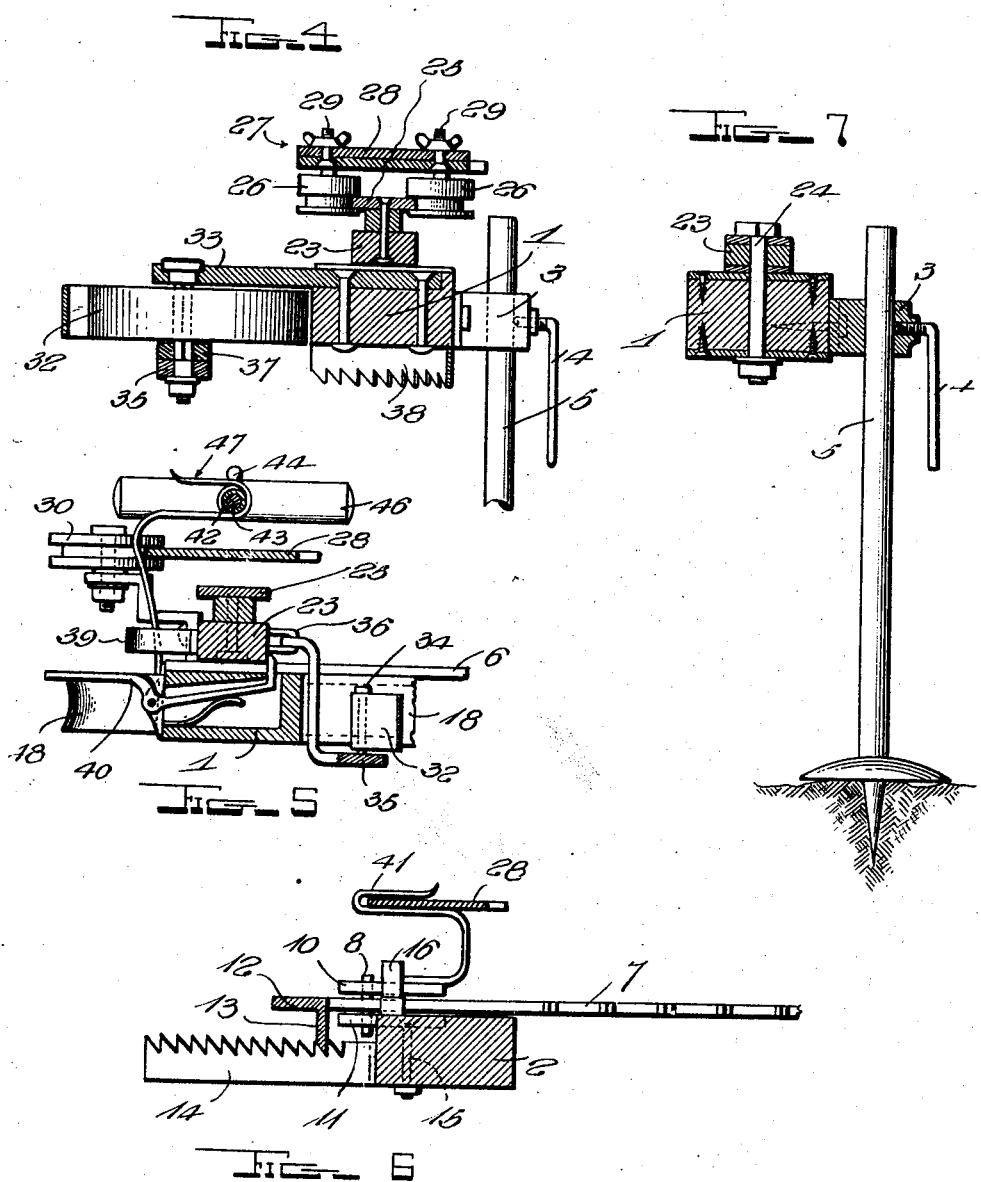
Witness
Inventor
Daniel W. Smith,
By H. B. Willson & Co.
Attorneys

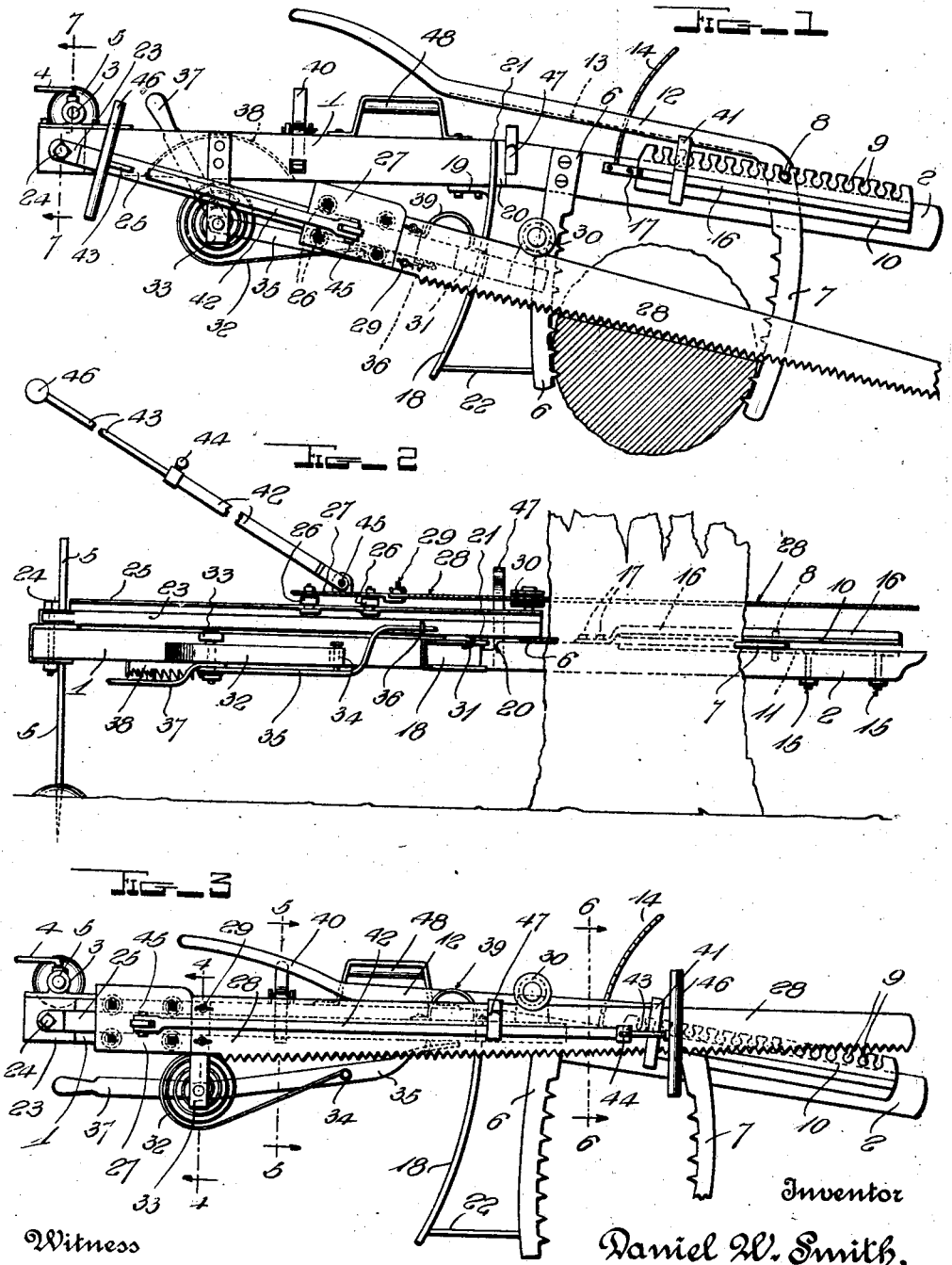

Patented May 4, 1926.

UNITED STATES PATENT OFFICE.

DANIEL W. SMITH, OF BANGOR, MAINE.

WOOD-SAWING MACHINE.

Application filed April 27, 1925. Serial No. 26,231.

*To all whom it may concern:*

Be it known that I, DANIEL W. SMITH, a citizen of the United States, residing at Bangor, in the county of Penobscot and State of Maine, have invented certain new and useful Improvements in Wood-Sawing Machines; and I do declare the following to be a full, clear, and exact description of the invention, such as will enable others skilled in the art to which it appertains to make and use the same.

My invention relates to new and useful improvements in wood-sawing machines of a type which can be used by one man for either felling trees or for sawing logs into desired lengths.

It is the object of the invention to provide a generally improved and simplified construction which may be easily set up and operated by one man, and may be conveniently folded and carried from place to place.

With the foregoing in view, the invention resides in the novel subject matter hereinafter described and claimed, the description being supplemented by the accompanying drawings.

Figure 1 is a top plan view of the machine in use for felling a tree.

Figure 2 is a side elevation with the machine in the position shown in Fig. 1.

Figure 3 is a top plan view showing the machine in folded position, in readiness to be carried from one place to another.

Figures 4, 5 and 6 are transverse sectional views as indicated by the correspondingly numbered lines of Fig. 3.

Figure 7 is a detail transverse section on line 7—7 of Fig. 1.

In the drawings above briefly described, the numeral 1 designates a main, elongated, supporting bar whose front end portion 2 is preferably at a widely obtuse angle to its body portion. The rear end of the bar 1 is provided with a bearing 3 having a clamping screw 4, which bearing adjustably receives a suitably constructed supporting leg 5 for use when felling trees only. Projecting laterally from the front portion of the bar 1, is a stationary jaw 6 which is cooperable with an opposed, movable jaw 7. This movable jaw is provided with a fulcrum 8 engageable with notches 9 in upper and lower metal plates 10 and 11 which extend longitudinally of the front end 2 of the aforesaid bar 1, and said jaw 7 is provided with a rearwardly extending operating lever 12 having a longitudinal flange 13 engageable with a suitable rack 14 which projects laterally from the bar 1. The plate 11 is preferably inset in the upper side of the bar 2 and is secured to the latter by any preferred means such as bolts 15, and the toothed or notched edge of this plate, projects laterally from the edge of the bar 1 remote from the jaws 6 and 7. The upper plate 10 is carried entirely by a rigid longitudinal bar 16, secured to it in any desired manner, the inner or rear end of this bar being bent downwardly and secured at 17 to the main supporting bar 1. It will be observed from Fig. 2, that the front ends of the plates 10 and 11 are absolutely free of connection with each other and are spaced apart vertically. This permits exceptionally easy insertion of the jaw 7 between these plates, and also permits the jaw to be removed with equal ease, whenever desired. It is to be further noted, that the jaw 7 may be adjusted to any desired distance with respect to the jaw 6, and its fulcrum 8 then engaged with certain of the notches 9, whereupon the lever 13 may be actuated to tightly move the jaw 7 into gripping relation with the jaw 6, the movable jaw being then held by the flange 13 and rack 14.

Projecting laterally from the bar 1, in rearwardly spaced relation with the stationary jaw 6, is a curved track or arm 18, this arm or track being preferably formed from a length of channel metal, longitudinally split at one end and having the body portion of such end bent laterally as at 19 (Fig. 1) and bolted to one edge of the main supporting bar 1. The remaining portion of the channel bar, at the split end of the latter, extends across the upper side of the bar 1 and the latter is transversely grooved as at 20, adjacent said remaining portion, the latter being indicated at 21. This construction is provided for a purpose to appear, but it may be stated at this point, that a connection 22 is provided between the outer end of the track 18 and the stationary jaw 6, so that they relatively brace each other.

A saw-carrying arm 23 extends longitudinally of the main supporting bar 1 and has its rear end pivoted at 24 to the rear end of said bar. This arm 23 is provided with a longitudinal track or runway 25 engaged by suitable rollers 26 on a saw carriage 27, a saw 28 being secured to this carriage by any desired means, such as the bolts 29. The front portion of the arm 23 is provided with a flanged roller 30 engaging the back edge of the saw 28 and said arm is also provided with a hook-like guide 31 which slidably engages the upper flange of the track 18, thus effectively guiding the movement of the aforesaid arm.

For feeding the saw 28 toward the work, a spiral spring 32 is provided, said spring being mounted on an arm 33 which projects laterally from the rear portion of the main supporting bar 1. One end of this spring is connected at 34 with a swinging arm 35 also supported by the arm 33, said swinging arm being in turn connected at 36 with the saw-carrying arm 23. For tensioning the spring 32, a hand lever 37 is connected to said spring, said lever being co-operable with a curved rack 38 carried by the bar 1. When this lever is engaged with the rack after placing the spring 32 under tension, the latter will of course act to swing the arm 23 and the saw 28 toward the tree or log, but when said lever is disengaged from the rack, the saw and the arm 23 may be swung into close relation with the main supporting bar 1. Preferably, a handle 39 is provided on the arm 23 to effect this swinging of the arm and saw.

To hold the arm 23 in a position contiguous to the bar 1, as shown in Fig. 3, so that the device may readily be carried from one place to another, I provide an appropriate latch 40 which is mounted on the bar 1 and is engageable with the arm 23, as shown most clearly in Figs. 3 and 5. When this relation of parts exists, the saw 28 is preferably engaged with an appropriate hook 41, as shown in Figs. 1, 3 and 6, so that said saw cannot yield or spring sidewise away from the front end 2 of the bar 1.

For reciprocating the carriage 27, I provide a handle which preferably comprises two telescopic sections 42 and 43 and a set screw 44 for relatively securing them. One of these sections is pivoted at 45 to the carriage 27, and the rear end of the other section is provided with a transverse handgrip 46. This form of handle permits the operator to readily actuate the machine while in a standing position, even though said machine may be located very close to the ground. When the machine is to be carried from one place to another, the handle is folded forwardly and engaged with an appropriate hook 47 carried by the bar 1 as shown in Figs. 3 and 5. Preferably, the bar 1 is provided with a carrying handle 48 by means of which the entire machine may be readily carried in one hand, whenever necessary.

It will be seen from the foregoing that I have produced a greatly improved and simplified sawing machine, and one which will be easy to operate, and very efficient. As excellent results have been obtained from the general construction disclosed, it is preferably followed. However, within the scope of the invention as claimed, modifications may of course be made.

I claim:

1. A sawing machine comprising an elongated supporting bar, a rack bar on the front end of said supporting bar, a stationary jaw fixed to said supporting bar and projecting laterally therefrom at substantially right angles thereto and in an opposite direction from the teeth of said rack bar, a substantially right angular movable jaw having a fulcrum at its angle adapted to be adjustably engaged with said rack bar, one arm of said jaw projecting laterally from said supporting bar, parallel to and in co-operative relation with said stationary jaw to grip the trunk of a tree, the other arm of said movable jaw extending rearwardly along said supporting bar to form an operating lever, a saw-carrying arm pivoted on one end of said supporting bar, a saw-carrying carriage slidably mounted on said arm, an operating handle pivotally connected with said carriage and adapted to be folded along the same when not in use, said handle being formed in telescopically engaged sections, means on said supporting bar adapted to hold said handle in its folded position, means for holding said saw-carrying arm in line with said supporting bar to form a compact bundle when the saw is not in use, and a hand grip attached to said supporting bar for carrying the saw when the parts are in their inoperative positions.

2. A sawing machine having a main supporting bar, and a stationary jaw projecting laterally from said supporting bar in rearwardly spaced relation with its front end; a plate secured longitudinally upon said supporting bar in front of said stationary jaw, said plate projecting laterally from the supporting bar in the opposite direction from said stationary jaw and having longitudinally spaced notches in its projecting edge, a second plate spaced above the first named plate and substantially a duplicate thereof, a rigid bar secured longitudinally upon said second plate and having its rear end rigidly secured to the main supporting bar, the front ends of said rigid bar and the second plate being spaced above the main supporting bar and free of connection therewith, a movable jaw removably received between said plates and having a fulcrum receivable in the notches thereof, a rigid lever extending rearwardly from said movable jaw, and a rack for holding said lever, said rack being secured to said main supporting bar.

3. In a sawing machine, a main supporting bar, a saw-carrying arm pivoted thereto at its rear end and having a guide, a curved track projecting laterally from said bar and engaged by said guide, stationary and movable jaws projecting laterally from said main supporting bar in the same direction as said track, the stationary jaw being disposed a slight distance in front of said track, and a connection between the outer ends of said stationary jaw and track whereby they serve to brace each other.

In testimony whereof I have hereunto affixed my signature.

DANIEL W. SMITH.